United States Patent
Lu (10) Patent No.: US 10,728,946 B2
(45) Date of Patent: Jul. 28, 2020

(54) SYSTEM INFORMATION HANDLING FOR DUAL CONNECTIVITY CELLULAR SYSTEMS

(71) Applicant: T-Mobile USA, Inc., Bellevue, WA (US)

(72) Inventor: Kun Lu, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 71 days.

(21) Appl. No.: 16/033,894

(22) Filed: Jul. 12, 2018

(65) Prior Publication Data

US 2020/0022200 A1    Jan. 16, 2020

(51) Int. Cl.
| | | |
|---|---|---|
| *H04W 76/15* | (2018.01) | |
| *H04L 12/24* | (2006.01) | |
| *H04W 88/08* | (2009.01) | |
| *H04W 88/06* | (2009.01) | |

(52) U.S. Cl.
CPC ......... *H04W 76/15* (2018.02); *H04L 41/0803* (2013.01); *H04W 88/06* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 2018/0007583 A1* | 1/2018 | Hong | H04W 76/10 |
| 2018/0070242 A1 | 3/2018 | Damnjanovic et al. | |
| 2018/0083688 A1 | 3/2018 | Agiwal et al. | |
| 2018/0160420 A1* | 6/2018 | Kim | H04W 56/0045 |
| 2019/0007892 A1* | 1/2019 | Sheik | H04L 5/0096 |
| 2019/0342824 A1* | 11/2019 | Futaki | H04W 36/14 |

FOREIGN PATENT DOCUMENTS

WO   WO2018004278 A1   1/2018

OTHER PUBLICATIONS

3GPP, "3rd Generation Partnership Project; Technical Specification Group Radio Access Network; Evolved Universal Terrestrial Radio Access (E-UTRA) and NR; Multi-connectivity; Stage 2", Retrieved from: https://portal.3gpp.org/desktopmodules/Specifications/SpecificationDetails.aspx?specificationId=3198 on Sep. 8, 2019, 3GPP TS 37.340 vol. 15.2.0, Jun. 20, 2018, sections 4.3.1.2-4.3.1.3, 7.1; and figure 4.3.1.1-1., 56 pages.
The PCT Search Report and Written Opinion dated Oct. 1, 2019, for PCT Application No. PCT/US2019/036282, 13 pages.

* cited by examiner

*Primary Examiner* — Saumit Shah
(74) *Attorney, Agent, or Firm* — Lee & Hayes, P.C.

(57) ABSTRACT

A cellular communication network may be configured to use a primary Long-Term Evolution (LTE) base station and a secondary New Radio (NR) base station to implement a Non-Standalone Architecture (NSA) configuration. The primary LTE base station broadcasts system information, for reception by the communication device, using System Information Blocks (SIBs). The secondary NR base station, however, may be configured to not broadcast certain system information. Rather, system information of the NR base station is specified to the communication device in communications from the LTE base station during setup of an NR data connection. When there is a change in the system information of the NR base station, the network is configured to forgo updating the communication device with the new system information at least until the existing NR data connection is terminated.

20 Claims, 4 Drawing Sheets

SYSTEM INFORMATION HANDLING FOR DUAL CONNECTIVITY CELLULAR SYSTEMS

BACKGROUND

Cellular communication devices use network radio access technologies to communicate wirelessly with geographically distributed cellular base stations. Long-Term Evolution (LTE) is an example of a widely implemented radio access technology that is used in $4^{th}$ Generation (4G) communication systems. New Radio (NR) is a newer radio access technology that is used in $5^{th}$ Generation (5G) communication systems. Standards for LTE and NR radio access technologies have been developed by the 3rd Generation Partnership Project (3GPP) for use by wireless communication carriers.

A communication protocol defined by the 3GPP, referred to as EN-DC (E-UTRAN/New Radio-Dual Connectivity) enables the simultaneous use of LTE and NR radio access technologies for communications between a mobile device and a cellular communication network. EN-DC may also be referred to as LTE/NR dual connectivity. EN-DC is described by 3GPP Technical Specification (TS) 37.340.

EN-DC can be implemented in conjunction with a 4G core network, with the support of 5G base stations, in a configuration known as Non-Standalone Architecture (NSA). In this configuration, a 4G LTE base station (referred to as a Master eNodeB or MeNB) is associated with a 5G NR base station (referred to as a Secondary gNodeB or SgNB). In an NSA system, both the LTE base station and the NR base station support a 4G core network. However, control communications are between the 4G core network and the LTE base station, and the LTE base station is configured to communicate with and to control the NR base station.

In an NSA system, a mobile device initially connects to an LTE base station. When in a connected state, the LTE base station instructs the device to determine whether it is receiving a signal of sufficient strength from a specified NR base station. If the device finds a sufficiently strong signal from the NR base station, the LTE base station communicates with the mobile device and the NR base station to supply information needed to establish an NR connection between the mobile device and the NR base station. After this connection is established, the LTE base station forwards downstream user data to the NR base station for transmission to the mobile device. In certain situations, downstream user data may be transmitted over one or both of the LTE connection and the NR connection. Similarly, the mobile device transmits upstream user data to the NR base station using the NR connection. In certain situations, upstream user data may be transmitted over one or both LTE and NR connections.

There are several proposed configurations for NSA dual connectivity, and communications between the components may be implemented in various ways in other configurations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are techniques that can be used in networks that implement dual connectivity for responding to changes in base station system information. In particular, the described techniques can be used to handle changes in system information of an NR base station that is being used as a secondary node in dual connectivity communications.

In described embodiments, a dual connectivity data session between a cellular communication device and a communication network is implemented by a primary LTE data connection and a secondary NR data connection. Initially, the device connects to an LTE base station. The LTE base station is configured to communicate with an associated NR base station in order to establish a secondary data connection between the device and the NR base station.

The initial connection between the device and the LTE base station is configured based on LTE system information. System information in the LTE environment is broadcast by the LTE base station in data objects referred to as System Information Blocks (SIBs). System information may include information relating to cell access, scheduling, communication channels and frequencies, network identifiers, tracking area codes (TACs), cell IDs, status, power levels, paging information, neighboring cells, etc.

Cellular communication devices receive the LTE system information prior to establishing connections with LTE base stations, as well as during the connections. When there are changes in the system information of an LTE base station, the connected cellular communication devices are notified and the changes are retrieved from subsequently broadcast SIBs.

After the primary LTE data connection is established, the LTE base station instructs the device and the NR base station to establish a secondary data connection. In accordance with 3GPP TS 37.340, paragraph 7.1, the NR base station 110 may be configured to not broadcast certain system information of the NR base station 110. Rather, system information regarding the NR base station is provided to the device through dedicated Radio Resource Control (RRC) messaging from the LTE base station to the device.

In environments where the NR base station broadcasts limited or no system information, a connected device may not be able to determine changes in NR system information. To address this, 3GPP TS 37.340, paragraph 7.1, specifies that a change in system information of the NR base station is handled by releasing and then re-adding the NR base station to the data session via one or more RRC reconfiguration messages sent from the LTE base station.

In accordance with embodiments described herein, however, existing secondary NR data connections are maintained even after changes in NR system information. That is, no change is made to a secondary NR data connection in response to a change in NR system information. Rather, the secondary NR data connection is maintained until it is terminated for other reasons, such as the end of the data session or when the device moves out of the coverage range of the NR base station.

When setting up new secondary NR data connections, the setup information from the LTE base station specifies current NR system information, which reflects any previous changes or updates to the NR system information.

These techniques reduce the network control signaling that would otherwise result from releasing and re-adding connections whenever NR system information changes. Without these techniques, the control signaling involved in releasing and re-adding NR connections might result in network congestion and overloading of network control components. The techniques also reduce chances of radio link failure (RLF), which may result in situations where the LTE base station sends an RRC Reconfiguration signaling message, but the message is not received soon enough.

Figure 1:
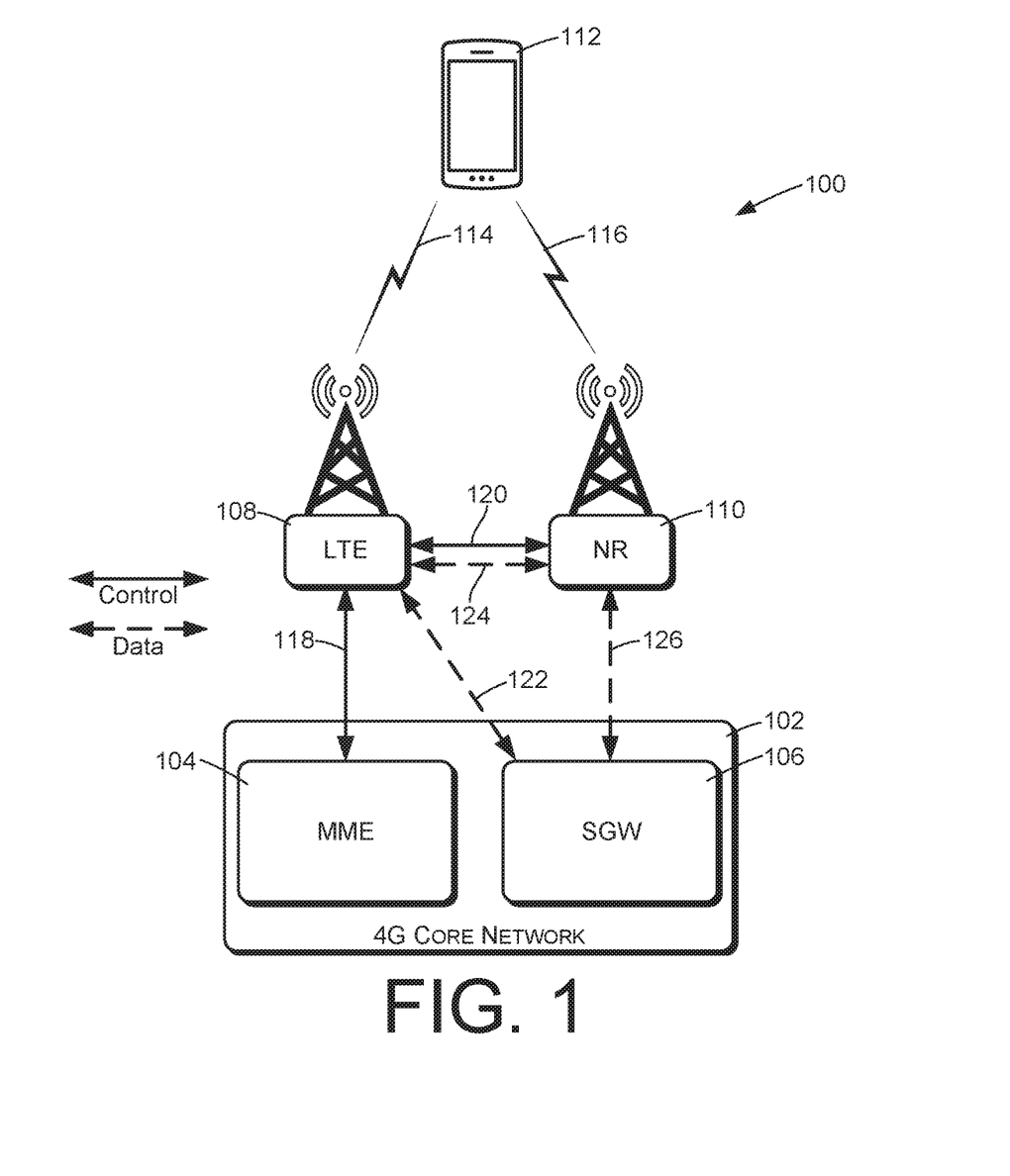
FIG. 1 is a block diagram of a cellular communication network, illustrating dual connectivity with base stations of a cellular site.

FIG. 1 illustrates an example cellular communication network 100 in which the described techniques may be implemented. The components shown in FIG. 1 may be used to implement dual connectivity, for use in a Non-Standalone Architecture (NSA) configuration. When using NSA, a communication device uses both an LTE carrier and an NR carrier for uplink and downlink transmissions to and from respective LTE and NR base stations. The LTE carrier is used for control-plane messaging and for user-plane communications. The NR carrier is used for additional user-plane bandwidth.

For purposes of discussion, a 4G or LTE component is a component that performs according to 4G or LTE communications standards. A 4G or LTE signal or communication is a signal or communication that accords with 4G or LTE communications standards. A 5G or NR component is a component that performs according to 5G or NR communications standards. A 5G or NR signal or communication is a signal or communication that accords with 5G or NR communications standards.

The network 100 has a 4G core network 102. Components of the 4G core network 102 that are relevant to this discussion include a Mobility Management Entity (MME) 104 and a Serving Gateway (SGW) 106. The MME 104 and the SGW 106 may be implemented in accordance with 3GPP 4G specifications. FIG. 1 also shows a 4G LTE base station 108, a 5G NR base station 110, and a cellular communication device 112. The cellular communication device 112 may be referred to in the following discussion as the device 112.

Control plane communication channels between the base stations and the components of the 4G core network are shown as solid lines such as 118 and 120. Data plane communication channels between the base stations and the components of the 4G core network are shown as dashed lines such as 122, 124, and 126. Wireless communications between the cellular communication device and the base stations are shown as lightning bolt symbols such as 114 and 116.

The LTE base station 108 and the NR base station 110 may in some cases be associated with each other by being co-located at a single cell site. Although only a single pair of base stations is shown in FIG. 1, the network 100 may include multiple cell sites, some of which might have both an LTE base station and an NR base station.

The MME 104 acts as a control node for the 4G core network 102. In practice, a 4G core network may have multiple MMEs.

The SGW 106 is a communication gateway of the 4G core network 102. The SGW 106 is a data plane interface with the LTE and NR base stations 108 and 110, respectively. A 4G core network may have multiple SGWs.

The LTE base station 108 is configured in accordance with 4G LTE standards to communicate with devices using the LTE radio access technology. The NR base station 110 is configured in accordance with 5G NR standards to communicate with devices using NR radio access technology. An LTE base station is often referred to as an eNodeB. An NR base station is often referred to as a gNodeB.

The cellular communication device 112 may be one of many such devices that are configured for use within the cellular communication network 100. The device 112 may comprise any of various types of cellular communication devices that are capable of wireless data and/or voice communications, including smartphones and other mobile devices, "Internet-of-Things" (IoT) devices, smart home devices, computers, wearable devices, entertainment devices, industrial control equipment, etc. In certain environments, the device 112 may be referred to as a user equipment (UE) or mobile station (MS).

During a data communication session, the device 112 establishes a primary LTE data connection 114 with the LTE base station 108 and a secondary NR data connection 116 with the NR base station 110. The primary LTE data connection 114 is a wireless communication channel that uses LTE radio access technology. The secondary NR data connection 116 is a wireless communication channel that uses NR radio access technology.

The network 100 uses a first control-plane communication channel 118 between the MME 104 and the LTE base station 108, and a second control-plane communication channel 120 between the LTE base station 108 and the NR base station 110. The network 100 uses a first data-plane communication channel 122 between the SGW 106 and the LTE base station 108, and a second data-plane communication channel 124 between the LTE base station 108 and the NR base station 110. Some implementations may also have a data-plane communication channel 126 between the SGW 106 and the NR base station 110.

During a dual connectivity data session, a downlink data stream is provided by the SGW 106 to the LTE base station 108 over the data-plane communication channel 122. The LTE base station 108 transmits some of the downlink data over the primary LTE data connection 114. Remaining downlink data is sent to the NR base station 110 over the second data-plane communication channel 124, and transmitted by the NR base station 110 over the secondary NR data connection 116. In some implementations, the SGW 106 may communicate with the NR base station 110 over the data-plane communication channel 126, and may send a first part of the downlink data to the LTE base station 108 and a second part of the downlink data directly to the NR base station 110.

Uplink data is received by both the LTE base station 108 over the primary LTE data connection 114 and by the NR base station 110 over the secondary NR data connection 116. Uplink data received by the NR base station 110 is sent to the LTE base station 108 using the second data-plane communication channel 124 and combined with the uplink data received by the LTE base station 108. The LTE base station 108 then sends the aggregate uplink data to the SGW 106 using the data-plane communication channel 122. In some implementations, the NR base station 110 may use the data-plane communication channel 126 to send received uplink data directly to the SGW 106.

Although the device 112 is described as communicating through a single cell site using both LTE and NR communications, it may be that in certain situations the LTE communications are through an LTE base station of a first cell site and the NR communications are through an NR base station of another cell site.

Figure 2:
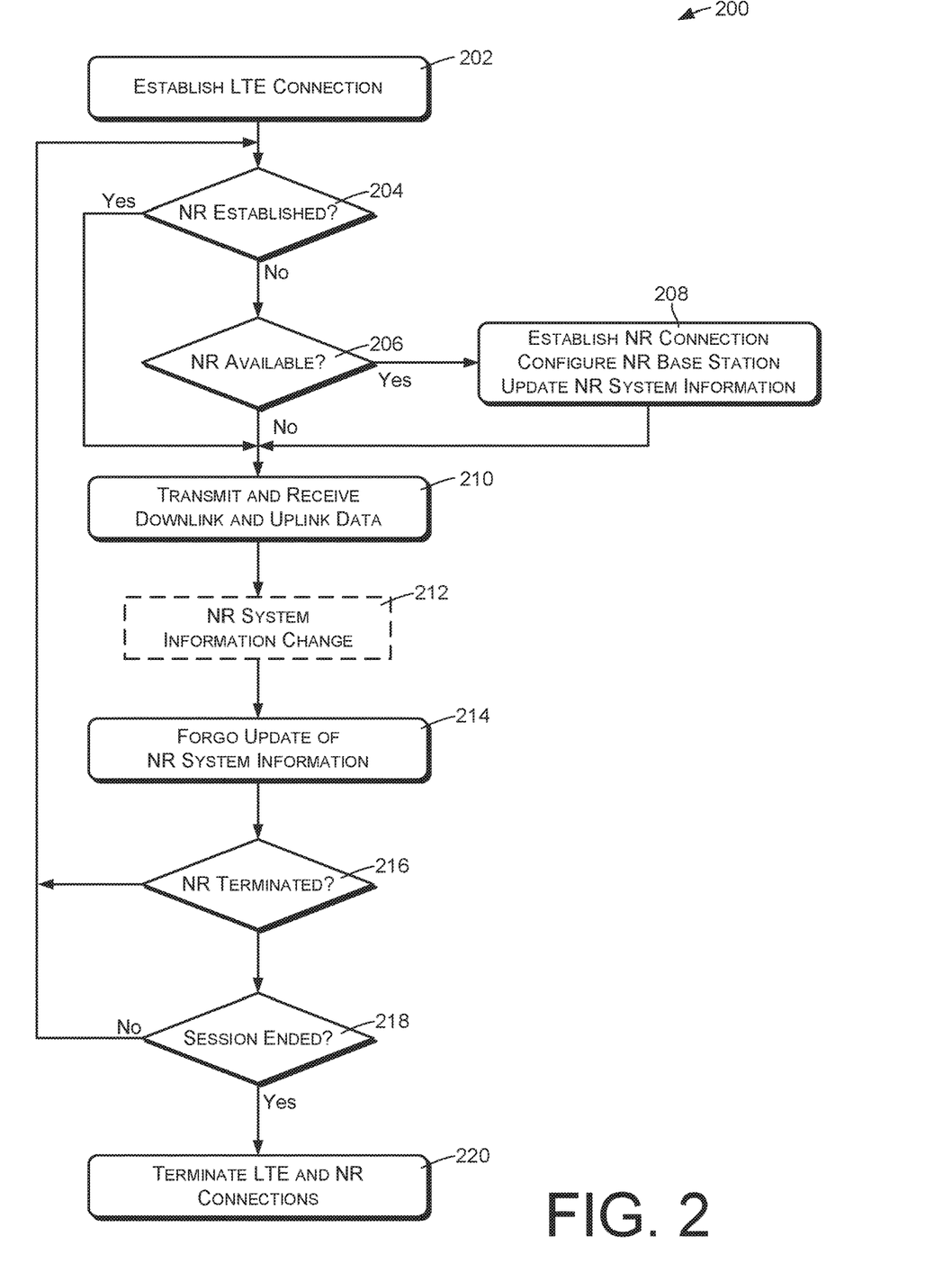
FIG. 2 is a flow diagram illustrating an example method of using LTE and NR base stations for dual connectivity.

FIG. 2 illustrates an example method 200 that may be performed to set up and terminate a data communication session with the cellular communication device 112 when using dual connectivity, such as when operating in an NSA mode of a hybrid 4G/5G communication network. The example method 200 will be described in the context of FIG. 1, although the method is also applicable in other environments.

Action 202 comprises establishing an LTE data connection between the cellular communication device 112 and the LTE base station 108. The LTE data connection will serve as a primary data connection when using NSA dual connectivity during the data session. The LTE data connection may be established by the LTE base station 108 in coordination with the MME 104, in accordance with 4G LTE specifications.

The action 202 may include wirelessly broadcasting System Information Blocks (SIBs) from the LTE base station 108 to specify system information of the LTE base station 108. The device 112 receives the SIBs and uses the specified system information to establish the LTE data connection with the LTE base station 108.

An action 204 comprises determining whether there is an existing NR connection established with the device 112. Initially, there will not be an NR connection. Because portions of the method 200 are repeated, however, further iterations of the action 204 may in some cases find that an NR connection has already been established with the device 112.

If an NR data connection is not currently established with the device 112, an action 206 is performed of determining whether an NR data connection is available to the device 112. For example, the action 206 may involve the LTE base station 108 instructing the device 112 to measure signal strengths and to attempt to find an NR signal of sufficient strength.

If an NR data connection is available to the device 112, as evidenced by the device 112 finding an NR signal of sufficient strength, an action 208 is performed. The action 208 comprises communicating with the NR base station 110 and the device 112, from the LTE base station 108, to establish an NR data connection between the NR base station 110 and the device 112. The NR data connection will serve as a secondary data connection when using NSA dual connectivity.

The action 208 may include configuring the NR base station 110 to transmit and receive data, using the NR data connection, as part of a data session with the device 112.

Communications with the device 112 in the action 208 may also include specifying current or updated system information of the NR base station 110 to the cellular communication device 112, prior to establishment of the NR data connection. System information of the NR base station 110 may be referred to below as NR system information.

In some embodiments, the action 208 may be performed by the LTE base station 108 using RRC signaling. Specifically, the LTE base station 108 may communicate with the NR base station 110 and the cellular communication device 112 using RRC signaling. For example, the LTE base station 108 may send one or more RRC messages to the device 112, wherein the RRC messages specify NR system information. RRC messages may also be sent from the LTE base station 108 to the NR base station 110, configuring the NR base station 110 to transmit data to and receive data from the cellular communication device 112.

If an NR data connection is not available in the action 206, if an NR data connection is established in the action 208, or if an NR data connection is found to already exist in the action 204, an action 210 is performed, comprising transmitting downlink data to the device 112 and receiving uplink data from the device 112.

The action 210 may be performed by the LTE base station 108 and the NR base station 110, assuming that an NR data connection is currently established. Generally, the action 210 comprises receiving a downlink data stream from the SGW 106 of the 4G core network 102 and forwarding at least a portion of the downlink data stream to the NR base station over the NR data connection. Under some conditions, the NR data connection may be used for the entire downlink data stream. Under other conditions, the LTE base station 108 may transmit a portion of the downlink data stream over the LTE data connection, and send another portion of the data stream to the NR base station for transmission over the NR data connection. The allocation of data to the LTE data connection and/or the NR data connection is determined based on factors such as NR signal quality, amount of queued data, buffer capacity, and possibly other factors.

Upstream data may be received by the LTE base station 108 and/or the NR base station 110, and may be aggregated to form a composite uplink data stream that is provided through the SGW 106 to the 4G core network 102.

Transmitting and receiving will be described in more detail below, in the discussions of FIGS. 3 and 4. Note that if an NR data connection has not been established, data is transmitted and received using only the LTE data connection.

During any period of time that there is an established NR data connection, an NR system information change event 212 may occur. That is, the system information of the NR base station 110 may change while the NR connection is established. The system information change event 212 is shown as a dashed box to indicate that the event 212 may or may not occur during any particular iteration of the actions of the example method 200.

System information may include information relating to cell access, scheduling, communication channels and frequencies, network identifiers, tracking area codes (TACs), cell IDs, status, power levels, paging information, neighboring cells, etc.

In the example method 200, after a change in the system information of the NR base station that results in updated NR system information, the network 100, as indicated at 214 of FIG. 2, forgoes updating the cellular communication device 112 with the updated NR system information, at least until the existing NR data connection is terminated for a reason other than a change in the NR system information. Specifically, during the period that an NR data connection exists with the cellular communication device 112, no steps are taken to inform the NR base station 110 of updated NR system information, despite the possibility of the NR system information change 212.

Furthermore, NR system information, including updated NR system information, is not broadcast by the NR base station 110 in some embodiments. Because of this, the NR data connection continues between the NR base station 110 and the device 112 based on the NR system information that was provided to the device 112 when the NR data connection was initially established in the action 208.

An action 216 comprises determining whether the NR data connection has terminated. The NR data connection may terminate for reasons other than termination of the data communication session. As one example, the NR data connection may be terminated or lost if the RF signal used for the NR data connection becomes weak as the device 112 moves about. In this case, another NR data connection may be established when the cellular communication device 112 moves back to a location where it can receive NR signals from the NR base station 110. The cellular communication device 112 is updated with the updated system information in conjunction with establishing this new NR data connection, in accordance with the action 208.

An action 218 comprises determining whether the data communication session is ending or has ended. If the data communication session is ending or has ended, an action 220 is performed of terminating the LTE data connection and terminating any existing NR data connection. Otherwise, if the data communication has not ended or is not ending, the method 200 is repeated, starting at the action 204.

In the described embodiments, the actions starting at the action 204 are iterated. As indicated by the actions 204, 206, and 208, an NR data connection is established with the cellular communication device 112 whenever possible. While the NR data connection exists, changes in system information of the NR base station may occur, but do not result in any updates to the device 112. Instead, updates of NR system information are provided to the cellular communication device 112 in the action 208, which occurs only in conjunction with creating a new NR data connection.

As an example scenario, the method 200 may initially perform the action 208 to establish an NR data connection to be used during a data communication session with the device 112. At some point during the data communication session, the NR data connection may be lost. At some further point during the data communication session, a new NR data connection may be established in the action 208. Any updated NR system information is specified to the cellular communication device 112 when performing the action 208 of setting up the new NR data connection.

The method 200 may be performed multiple times, for multiple data communications with the cellular communication device 112 and/or other devices.

Figure 3:
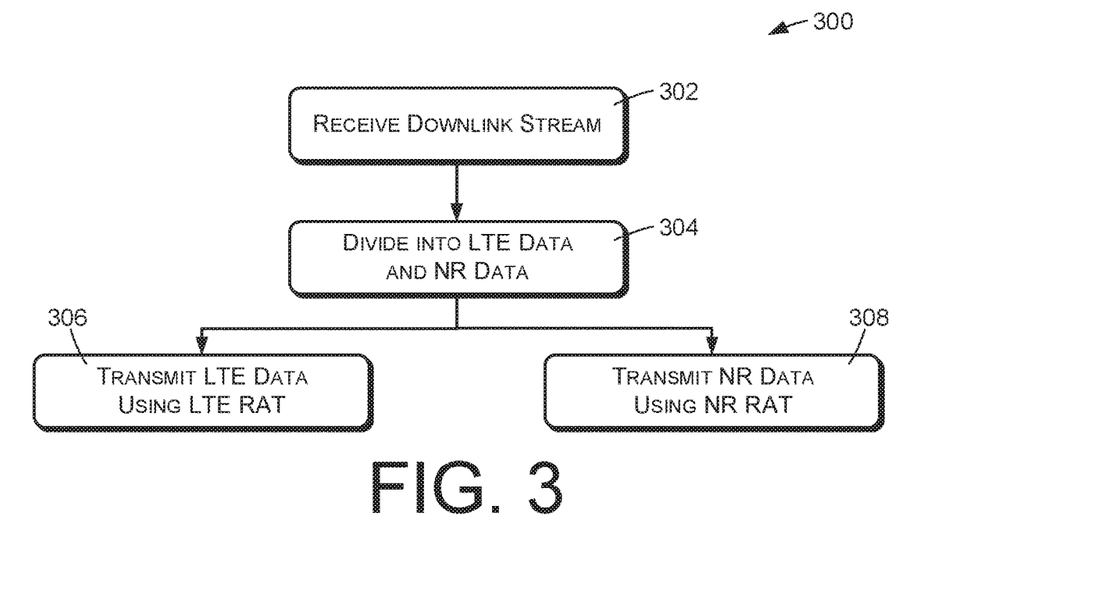
FIG. 3 is a flow diagram illustrating an example method of transmitting data when using dual connectivity.

FIG. 3 illustrates an example method 300 of transmitting data in accordance with the techniques described herein. The example method 300 implements dual connectivity, where data is transmitted using both LTE and NR data connections.

An action 302 comprises receiving a downlink data stream that is to be transmitted to a device such as the cellular communication device 112. An action 304 comprises dividing the data of the downlink data stream into first and second portions, referred to here as LTE data and NR data. Under some conditions, the action 304 may comprise designating all of the downlink data stream as NR data, to be transmitted using the NR base station. Under other conditions, the action 304 may comprise designating all of the downlink data stream as LTE data, to be transmitted using the LTE base station. In some situations, some of the downlink data may be designated as NR data and the remaining data may be designated as LTE data. The actions 302 and 304 may be performed by a primary base station, such as the LTE base station 108.

Actions 306 and 308 are performed concurrently by an LTE base station and an NR base station, respectively. The action 306 comprises transmitting any designated LTE data to the device 112 over a primary data connection that uses LTE radio access technology (RAT). The action 308 comprises transmitting the any designated NR data to the device 112 over a secondary data connection that uses NR radio access technology.

Figure 4:
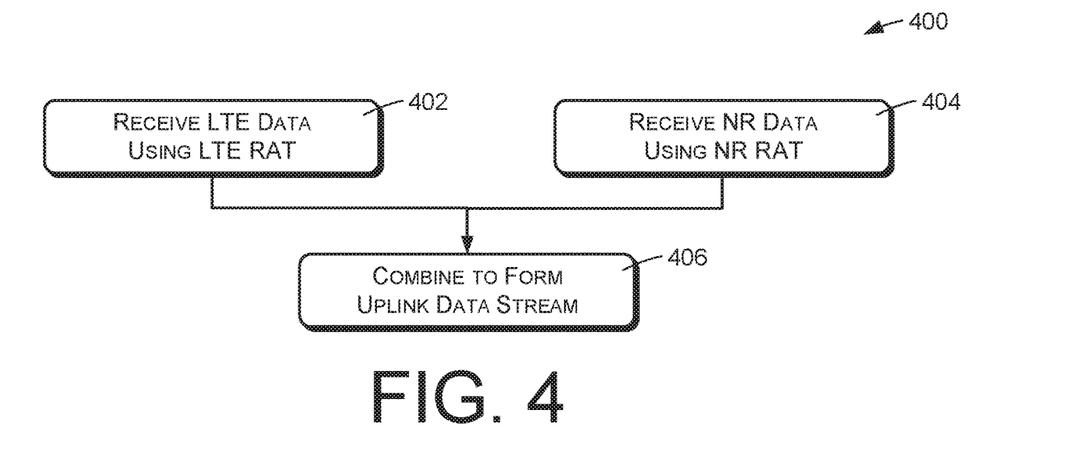
FIG. 4 is a flow diagram illustrating an example method of receiving data when using dual connectivity.

FIG. 4 illustrates an example method 400 of receiving data in accordance with the techniques described herein. The example method 400 implements dual connectivity, where data is received using both LTE and NR data connections.

Actions 402 and 404 are performed concurrently by an LTE base station and an NR base station, respectively. The action 402 comprises receiving LTE data of an uplink data stream from the device 112, over an LTE data connection using LTE radio access technology (RAT). The action 404 comprises receiving NR data of the uplink data stream from the device 112, over an NR data connection using NR radio access technology.

An action 406 comprises combining or aggregating the received LTE and NR data to form the uplink data stream, containing aggregated data sent from the device.

Figure 5:
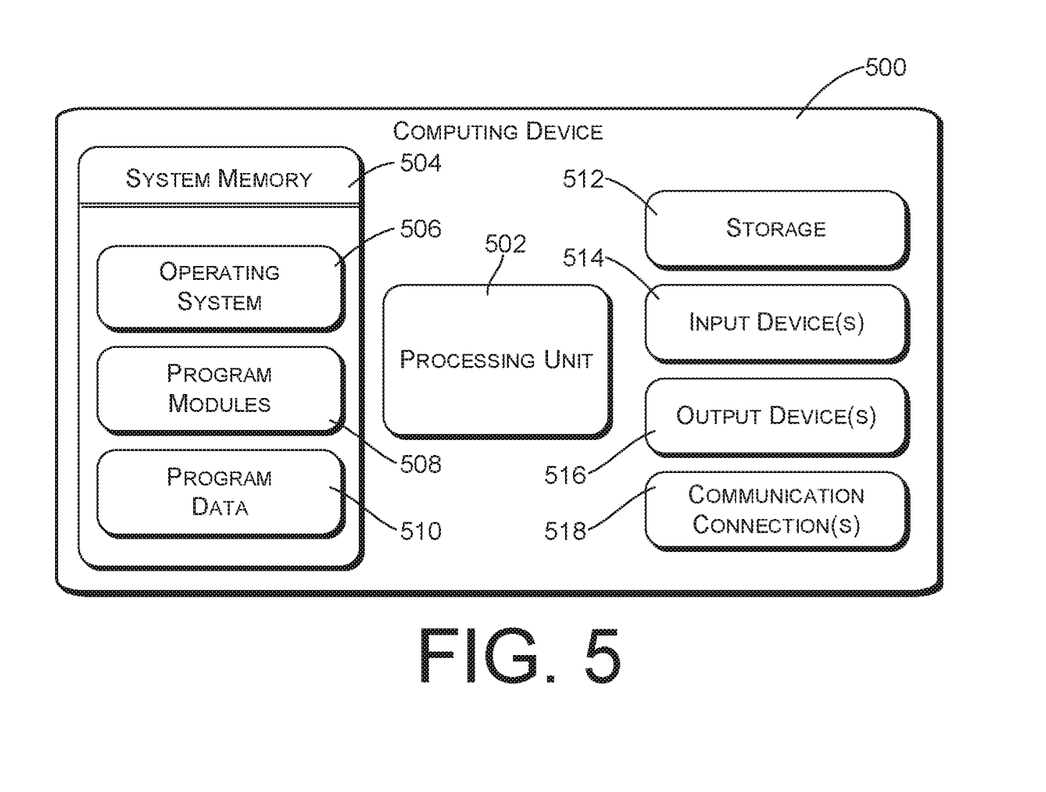
FIG. 5 is a block diagram of an example computing device that may be used to implement various functionality described herein.

FIG. 5 is a block diagram of an illustrative computing device 500 such as may be used to implement various components of a core network, a base station, and/or any servers, routers, gateways, administrative components, that may be used within a communications network. One or more computing devices 500 may be used to implement each of the base stations 108 and 110, for example. Similarly, one or more computing devices may be used to implement components of the 4G core network 102, such as the MME 104 and the SGW 106.

In various embodiments, the computing device 500 may include at least one processing unit 502 and system memory 504. Depending on the exact configuration and type of computing device, the system memory 504 may be volatile (such as RAM), non-volatile (such as ROM, flash memory, etc.) or some combination of the two. The system memory 504 may include an operating system 506, one or more program modules 508, and may include program data 510.

The computing device 500 may also include additional data storage devices (removable and/or non-removable) such as, for example, magnetic disks, optical disks, or tape. Such additional storage devices are illustrated in FIG. 5 as storage 512.

Non-transitory computer storage media of the computing device 500 may include volatile and nonvolatile, removable and non-removable media, implemented in any method or technology for storage of information, such as computer readable instructions, data structures, program modules, or other data. The system memory 504 and storage 512 are all examples of computer-readable storage media. Non-transitory computer-readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by computing device 500. Any such non-transitory computer-readable storage media may be part of the computing device 500.

In various embodiment, any or all of the system memory 504 and storage 512 may store programming instructions which, when executed, implement some or all of the function functionality described above.

The computing device 500 may also have input device(s) 514 such as a keyboard, a mouse, a touch-sensitive display, voice input device, etc. Output device(s) 516 such as a display, speakers, a printer, etc. may also be included. The computing device 500 may also contain communication connections 518 that allow the device to communicate with other computing devices.

Although features and/or methodological acts are described above, it is to be understood that the appended claims are not necessarily limited to those features or acts. Rather, the features and acts described above are disclosed as example forms of implementing the claims.

What is claimed is:

1. A method, comprising:
establishing a primary data connection between a cellular communication device and a first base station, wherein the first base station is associated with a second base station;
communicating with the cellular communication device from the first base station to establish a secondary data connection between the cellular communication device and the second base station, wherein the communicating includes specifying system information of the second base station;
receiving a downlink data stream to be transmitted to the cellular communication device;
transmitting first data of the downlink data stream to the cellular communication device from the first base station over the primary data connection;
transmitting second data of the downlink data stream to the cellular communication device from the second base station over the secondary data connection;
after a change in the system information of the second base station that results in updated system information of the second base station, forgoing updating the cellular communication device with the updated system information at least until the secondary data connection is terminated for a reason other than the change in the system information of the second base station;
terminating the secondary data connection for a reason other than the change in the system information of the second base station;
establishing another secondary data connection between the cellular communication device and the second base station; and
updating the cellular communication device with the updated system information in conjunction with establishing the other secondary data connection.

2. The method of claim 1, further comprising:
wirelessly broadcasting one or more System Information Blocks (SIBs) from the first base station to specify system information of the first base station;
wherein the updated system information of the second base station is not broadcast by the second base station.

3. The method of claim 1, further comprising:
receiving first data of an uplink data stream from the cellular communication device over the primary data connection;
receiving second data of the uplink data stream from the cellular communication device over the secondary data connection; and
aggregating the first data and the second data.

4. The method of claim 1, further comprising sending the second data of the downlink data stream from the first base station to the second base station.

5. The method of claim 1, wherein specifying the system information of the second base station comprises sending one or more Radio Resource Control (RRC) messages from the first base station to the cellular communication device.

6. The method of claim 1, wherein:
the primary data connection uses a 4th Generation (4G) radio access technology; and
the secondary data connection uses a 5th Generation (5G) radio access technology.

7. The method of claim 1, further comprising configuring the primary data connection and the secondary data connection to implement a Non-Standalone Architecture (NSA) of a 5th-Generation (5G) communication network.

8. A first base station, comprising:
one or more processors; and
one or more non-transitory computer-readable media storing computer-executable instructions that, when executed by the one or more processors, cause the first base station to perform actions comprising:
establishing a primary data connection with a cellular communication device;
communicating with the cellular communication device to set up a secondary data connection between the cellular communication device and a second base station, wherein the communicating includes specifying system information of the second base station;
receiving a downlink data stream to be transmitted to the cellular communication device;
configuring the second base station to transmit at least a portion of the downlink data stream to the cellular communication device over the secondary data connection; and
forgoing updating of the cellular communication device with updated system information of the second base station at least until the secondary data connection is terminated for a reason other than a change in the system information.

9. The first base station of claim 8, the actions further comprising specifying the updated system information in conjunction with establishing another secondary data connection between the second base station and the cellular communication device.

10. The first base station of claim 8, the actions further comprising broadcasting one or more System Information Blocks (SIBs) from the first base station to specify system information of the first base station.

11. The first base station of claim 8, wherein the communicating comprises configuring the second base station to receive a second portion of the uplink data stream from the cellular communication device over the secondary data connection.

12. The first base station of claim 8, wherein specifying the system information of the second base station comprises sending one or more Radio Resource Control (RRC) messages to the cellular communication device.

13. The first base station of claim 8, wherein:
the first base station is a Long-Term Evolution (LTE) base station; and
the second base station is a New Radio (NR) base station.

14. A method, comprising:
establishing a first data connection between a first base station and a cellular communication device;
establishing a second data connection between a second base station and the cellular communication device, wherein establishing the second data connection includes specifying system information of the second base station;
communicating with the cellular communication device using the first data connection and the second data connection; and
forgoing updating the cellular communication device with updated system information of the second base station at least until the second data connection is terminated for a reason other than a change in the system information of the second base station.

15. The method of claim 14, further comprising specifying the updated system information when establishing another data connection between the second base station and the cellular communication device.

16. The method of claim 14, further comprising:
broadcasting one or more System Information Blocks (SIBs) from the first base station to specify system information of the first base station; and
wherein the updated system information is not broadcast by the second base station.

17. The method of claim 14, further comprising sending a portion of a data stream from the first base station to the second base station.

18. The method of claim 14, wherein specifying the system information of the second base station comprises sending one or more Radio Resource Control (RRC) messages to the cellular communication device.

19. The method of claim 14, wherein:
the first data connection uses a 4th Generation (4G) radio access technology; and
the second data connection uses a 5th Generation (5G) radio access technology.

20. The method of claim 14, further comprising configuring the first data connection and the second data connection to implement a Non-Standalone Architecture (NSA) of a 5th-Generation (5G) communication network.

\* \* \* \* \*